United States Patent
Okino et al.

(10) Patent No.: US 8,325,859 B2
(45) Date of Patent: Dec. 4, 2012

(54) COMMUNICATION DEVICE AND CONTROL METHOD

(75) Inventors: Kenta Okino, Yokohama (JP); Takeshi Toda, Yokohama (JP)

(73) Assignee: Kyocera Corporation, Kyoto (JP)

( * ) Notice: Subject to any disclaimer, the term of this patent is extended or adjusted under 35 U.S.C. 154(b) by 722 days.

(21) Appl. No.: 12/439,091

(22) PCT Filed: Aug. 23, 2007

(86) PCT No.: PCT/JP2007/066400
§ 371 (c)(1),
(2), (4) Date: Oct. 13, 2009

(87) PCT Pub. No.: WO2008/029632
PCT Pub. Date: Mar. 13, 2008

(65) Prior Publication Data
US 2010/0046680 A1   Feb. 25, 2010

(30) Foreign Application Priority Data
Aug. 30, 2006   (JP) .................................. 2006-234493

(51) Int. Cl.
*H04L 1/00* (2006.01)
(52) U.S. Cl. ........ 375/346; 375/343; 375/340; 375/316; 370/320; 370/335; 370/342
(58) Field of Classification Search .................. 375/346, 375/343, 340, 316; 370/320, 335, 342
See application file for complete search history.

(56) References Cited

U.S. PATENT DOCUMENTS

| | | | |
|---|---|---|---|
| 7,012,978 B2 * | 3/2006 | Talwar | 375/346 |
| 7,174,493 B2 | 2/2007 | Matsumoto et al. | 714/748 |
| 2004/0043784 A1 * | 3/2004 | Czaja et al. | 455/522 |
| 2004/0102203 A1 * | 5/2004 | Tiirola et al. | 455/515 |
| 2004/0148552 A1 | 7/2004 | Matsumoto et al. | 714/712 |
| 2006/0120439 A1 * | 6/2006 | Smee et al. | 375/148 |
| 2007/0147253 A1 * | 6/2007 | Sutivong et al. | 370/236 |
| 2007/0165757 A1 * | 7/2007 | Heiman et al. | 375/347 |

FOREIGN PATENT DOCUMENTS

| | | |
|---|---|---|
| JP | 2003-273844 | 9/2003 |
| JP | 2006-019820 | 1/2006 |
| WO | WO 98/53560 | 11/1998 |

* cited by examiner

*Primary Examiner* — Kenneth Lam
(74) *Attorney, Agent, or Firm* — DLA Piper LLP (US)

(57) ABSTRACT

A communication device according to the present invention includes a receiver configured to receive, through a radio link, packet signals each including a known signal indicating information known by the communication device and an unknown signal indicating information not known by the communication device, and a combiner configured to combine the packet signals while decreasing noise signals included in each of the packet signals. The communication device includes a correlation comparator configured to compare a correlation between the known signals in each of the packet signals with a correlation between the unknown signals in each of the packet signals, and a combining scheme controller configured to control a scheme of combining the packet signals, on the basis of the comparison result by the correlation comparator.

8 Claims, 10 Drawing Sheets

COMMUNICATION DEVICE AND CONTROL METHOD

TECHNICAL FIELD

The present invention relates to a communication device and a control method, which receive packet signals through a radio link, and combine the packet signals while decreasing noise signals included in the packet signals.

BACKGROUND ART

Conventionally, in a radio communication system for transmitting and receiving packet signals, Hybrid Automatic Repeat Request (HARQ), which is a technology for improving an error rate of the packet signals, has been used (see Non-patent Document 1, for example) Even when detecting an error in a received packet signal, a communication device equipped with the HARQ function does not discard the packet signal from which the error has been detected, but combines the packet signal with a retransmitted packet signal.

A general configuration of the communication device equipped with the HARQ function will be described with reference to FIG. 1. A description of the communication device shown in FIG. 1 is given by taking as an example of a case where HARQ is performed by using a Chase Combining (CC) scheme. As shown in FIG. 1, the communication device equipped with the HARQ function includes an error detector 41, a memory 42, a retransmission request generator 43, and a combiner 44.

The error detector 41 performs a decoding operation, such as error correction, on a signal outputted from the combiner 44, and then detects whether or not the signal has an error. Furthermore, the error detector 41 supplies a control signal which is based on whether or not there is an error, to the memory 42 and the retransmission request generator 43.

In response to the control signal from the error detector 41, the memory 42 saves the combined packet signal. In the following, the packet signal saved in the memory 42 is referred to as a "saved signal," as appropriate.

Upon detection of the necessity of a retransmission request in response to the control signal from the error detector 41, the retransmission request generator 43 transmits a retransmission request signal to a sender of the packet signal.

The combiner 44 calculates a combining weight of the retransmission packet signal (hereinafter referred to as a retransmission signal) and the saved signal, on the basis of a preset combining weight calculation scheme. Then, the combiner 44 generates a combined packet signal (hereinafter referred to as a combined signal) by combining the retransmission signal and the saved signal.

Specifically, the packet signal includes a known signal indicating information, such as a training sequence (TS), known by the receiving side, and an unknown signal indicating content of communication data not known by the receiving side.

Then, by using the preset combining weight calculation scheme such as Minimum Mean Squared Error (MMSE) scheme, the combiner 44 calculates a combining weight used to combine the saved signal and the retransmission signal, on the basis of the known signal included in the saved signal and the known signal included in the retransmission signal. Then, the combiner 44 combines the saved signal and the retransmission signal on the basis of the calculated combining weight.

In this way, the communication device equipped with the HARQ function calculates the combining weight on the basis of known signals included in the saved signal and the retransmission signal, and combines the saved signal and the retransmission signal on the basis of the calculated combining weight. This is performed to improve the error rate in the combined signal even when a received signal includes a noise signal such as a delay signal or an interference signal.

In a radio communication system in which radio communications are performed among multiple communication devices at the same timing and over the same channel by means of Space Division Multiple Access (SDMA) scheme or the like, a packet signal sometimes includes, as a large noise signal, an interference signal of a radio signal transmitted to another certain one of the communication devices.

FIGS. 2(a) and 2(b) show a relationship of packet signals on the time axis when communication devices 1 and 2 detect error in their respective packet signals received at the same timing t(m) because of their respective interruption signals, request retransmission, and receive retransmission signals at the same timing t(m+D).

In FIGS. 2(a) and 2(b), "m" represents a packet number, and "D" represents the number of packets before the retransmission signals. In addition, "TS1" and "TS2" represent known signals included in the packet signals received by the communication device 1 and the communication device 2, respectively. "Data1_m" and "Data2_m" represent unknown signals, such as data, included in the packet signals received by the communication device 1 and the communication device 2, respectively.

As shown in FIG. 2(a), the communication device 1 receives packet signals having the same packet number, at the timing t(m) and the timing t(m+D). Similarly, the communication device 2 receives packet signals having the same packet number, at the timing t(m) and the timing t(m+D). Thus, an interference signal included in the packet signal received by the communication device 1 at the timing t(m) is almost equivalent to an interference signal included in the packet signal received by the communication device 1 at the timing t(m+D).

When combining the packet signals with the HARQ function, the communication device 1 calculates a combining weight by referring to the known signal TS1 included in the saved signal received and saved at the timing t(m), and to the known signal TS1 included in the retransmission signal received at the timing t(m+D). Then, the communication device 1 combines the saved signal and the retransmission signal on the basis of the calculated combining weight, and thereby obtains a combined signal in which an interference signal in the unknown signal Data1_m including data or the like is decreased to improve the error rate.

[Non-patent Document 1] "Retransmission Control Scheme of Hybrid ARQ in MC-CDMA," Ken'ichi Miyoshi, and four others, Journal of Institute of Electronics, Information and Communication Engineers, B, Vol. J89-B, No. 2 pp. 182 to 194

DISCLOSURE OF THE INVENTION

Meanwhile, as shown in FIG. 2(b), there is also a case where only the communication device 1 detects an error in a signal received at the timing t(m) and requests retransmission, because of an interference signal generated in a packet signal for the communication device 2.

In such a case, the unknown signal Data1_m included in the packet signal received by the communication device 1 at the timing t(m) suffers interference by the unknown signal Data2_m for the communication device 2. On the other hand, the unknown signal Data1_m included in the retransmission signal received by the communication device 1 at the timing t(m+D) is interfered by an unknown signal Data2_m+D of a new packet signal transmitted to the communication device 2.

The known signal TS1 included in the packet signals received by the communication device 1 at the timing t(m) and the timing t(m+D), respectively, include similar interference signals of the known signal TS2 for the communication device 2. However, the unknown signal Data1_m included in the packet signals received by the communication device 1 at the timing t(m) and the timing t(m+D), respectively, include different interference signals.

Thus, there is a problem that desired improvement for the error rate is not accomplished even when the communication device 1 calculates the combining weight on the basis of the known signals TS1 included in the packet signals received at the timing t(m) and the timing t (m+D), and combines the unknown signals Data1_m included in the packet signals received at the timing t(m) and the timing t(m+D).

The above problem is caused because the communication devices 1 and 2 receive packet signals at the same timing and over is the same channel by using their respective known signals TS1 and TS2 that are unique to each other and fixed.

Thus, it may be possible to change the known signals TS1 and TS2 described above for every packet signal. However, frequent change of the known signals TS1 and TS2 not only complicates control, but also causes a different problem that control signals used for notification of the change increase overhead, thereby reducing throughput.

The present invention has been made in light of such circumferences, and an object of thereof is to provide a communication device and a control method that are capable of improving an error rate of combined packet signals in a radio communication system equipped with the HARQ function.

The present invention has the following characteristics to solve the problems described above. First of all, a first characteristic of the present invention is summarized as a communication device including: a receiver (receiver 20) configured to receive, through a radio link, a plurality of packet signals each including a known signal indicating information known by the communication device and an unknown signal indicating information not known by the communication device; and a combiner (combiner 44) configured to combine the packet signals while decreasing noise signals included in the packet signals. The communication device includes a correlation comparator (correlation comparator 503) configured to compare a correlation between known signals in the packet signals with a correlation between the unknown signals in the packet signals; and a combining scheme controller (combining scheme controller 504) configured to control a scheme of combining the packet signals, on the basis of a comparison result by the correlation comparator.

According to the above characteristic, the communication device compares a correlation between known signals included in the packet signals and a correlation between unknown signals included in the packet signals, and controls a scheme of combining the packet signals. Accordingly, unlike the conventional technique in which noise signals in the packet signals are decreased and combined only on the basis of a correlation of known signals that vary depending on influence by the noise signals, the communication device combines packet signals also considering the correlation between unknown signals that vary depending on influence by the noise signals.

Thus, in the radio communication system equipped with the HARQ function, an error rate of the combined packet signals can be further improved.

A second characteristic of the present invention is according to the first characteristic of the present invention and is summarized in that the communication device further includes a known correlation value calculator (known correlation value calculator 501) configured to calculate a known correlation value indicating a degree of correlation between the known signals included in each of the packet signals, and an unknown correlation value calculator (unknown correlation value calculator 502) configured to calculate an unknown correlation value indicating a degree of correlation between the unknown signals included in each of the packet signals. The correlation comparator compares the calculated known correlation value with the calculated unknown correlation value.

According to the above characteristic, the communication device compares the known correlation value of the packet signals with the unknown correlation value of the packet signals, and can control a combining scheme depending on situations such as when the known correlation value and the unknown correlation value approximate each other or when they do not approximate or the like. Thus, in the radio communication system equipped with the HARQ function, the error rate of the combined packet signals can be further improved.

A third characteristic of the present invention is according to the first or the second characteristic of the present invention, and summarized in that: the combining scheme controller selects whether to use a first combining scheme or to use a second combining scheme on the basis of the result obtained by the correlation comparator; the first combining scheme is a scheme of combining the packet signals after decreasing the highly correlated noise signals in the packet signals; and the second combining scheme is a scheme of combining the packet signals after amplifying correlated parts in the packet signals.

According to the above characteristic, the communication device compares the known correlation value with the unknown correlation value, and can combine packet signals by the first combining scheme that decreases the highly correlated noise signals in each known signal and each unknown signal of the packet signals, when in each known signal and each unknown signal of the packet signals, the known correlation value or the unknown correlation value that varies depending on influence by the noise signals is an approximate (highly correlated) value, for example.

In addition, the communication device compares the known correlation value with the unknown correlation value, and perform combining by the second combining scheme that amplifies highly correlated signal parts in each known signal and each unknown signal of the packet signals, when in the each known signal and the each unknown signal of the packet signals, the known correlation value or the unknown correlation value that varies depending on influence by the noise signals is not an approximate (lowly correlated) value, for example.

In this way, the communication device selectively uses the first combining scheme and the second combining scheme depending on the result of the comparison between the known correlation value and the unknown correlation value. Accordingly, the error rate of combined packet signals can be further improved.

A fourth characteristic of the present invention is according to the third characteristic of the present invention, and is summarized in that the correlation comparator compares a difference between the known correlation value and the unknown correlation value with a predetermined value, and the combining scheme controller selects the first combining scheme when the difference is less than the predetermined value.

According to the above characteristic, if the difference between the known correlation value and the unknown correlation value is less than the predetermined value, the communication device considers that in each known signal and each unknown signal of the packet signals, noise signals having analogous correlation (highly correlated) is included, selects the first scheme of decreasing the highly correlated noise signals, and can combine packet signals.

In addition, if the difference between the known correlation value and the unknown correlation value is a predetermined value or greater, the communication device considers that each known signal or each unknown signal of the packet signals includes a noise signal likely to have a different correlation (lowly correlated). Accordingly, the second scheme of amplifying and combining highly correlated signal parts is selected to combine the packet signals.

In this way, the communication device selectively uses the first combining scheme and the second combining scheme, depending on the difference between the known correlation value and the unknown correlation value. Accordingly, the error rate of the combined packet signals can be further improved.

A fifth characteristic of the present invention is summarized as a control method employed for a communication device including a receiver configured to receive, through a radio link, a plurality of packet signals each including a known signal indicating information known by the communication device and an unknown signal indicating information not known by the communication device, and a combiner configured to combine the is packet signals while decreasing noise signals included in the packet signals. The control method includes: a correlation comparison step of comparing a correlation between the known signals in the packet signals with a correlation between the unknown signals in the packet signals; and a combining scheme control step of controlling a scheme of combining the packet signals, on the basis of a result of the correlation comparison step.

A sixth characteristic of the present invention is according to the fifth characteristic of the present invention, and is summarized in that the control method further includes: a known correlation value calculation step of calculating a known correlation value indicating a degree of correlation between the known signals included in each of the packet signals; and an unknown correlation value calculation step of calculating an unknown correlation value indicating a degree of correlation between the unknown signals included in each of the packet signals. In the correlation comparison step, the calculated known correlation value is compared with the calculated unknown correlation value.

A seventh characteristic of the present invention is according to the fifth or sixth characteristic of the present invention, and is summarized in that: in the combining scheme control step, whether to use a first combining scheme or to use a second combining scheme is selected on the basis of the result obtained in the correlation comparison step; the first combining scheme is a scheme of combining the packet signals after decreasing highly correlated noise signals in the packet signals; and the second combining scheme is a scheme of combining the packet signals after amplifying correlated parts in the packet signals.

An eight characteristic of the present invention is according to the seventh characteristic of the present invention, and is summarized in that: in the correlation comparison step, a difference between the known correlation value and the unknown correlation value is compared with a predetermined value; and in the combining scheme control step, the first combining scheme is selected when the difference is less than the predetermined value.

According to the characteristics of the present invention, it is possible to provide a communication device and a control method that can improve an error rate of combined packet signals, in a radio communication system equipped with the HARQ function.

BEST MODES FOR CARRYING OUT THE INVENTION

Figure 1:
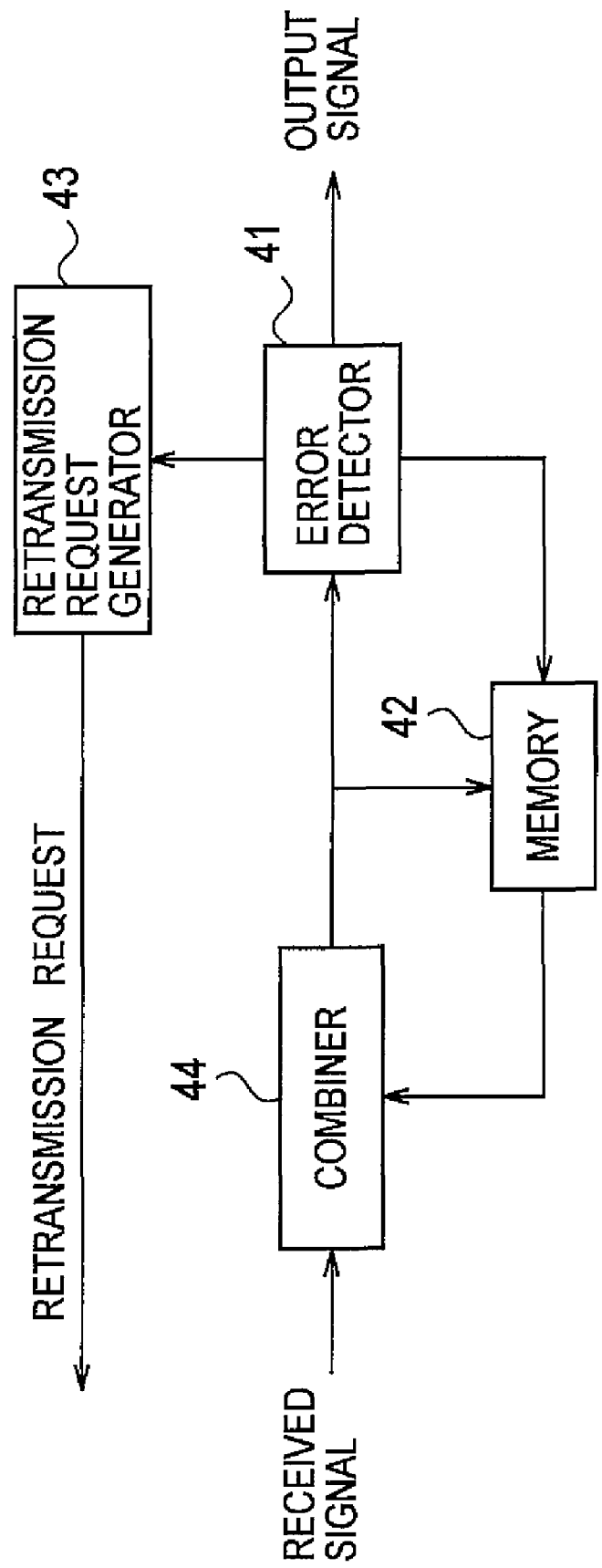
FIG. 1 is a functional block configuration diagram of a communication device according to a conventional technique.
Figure 2:
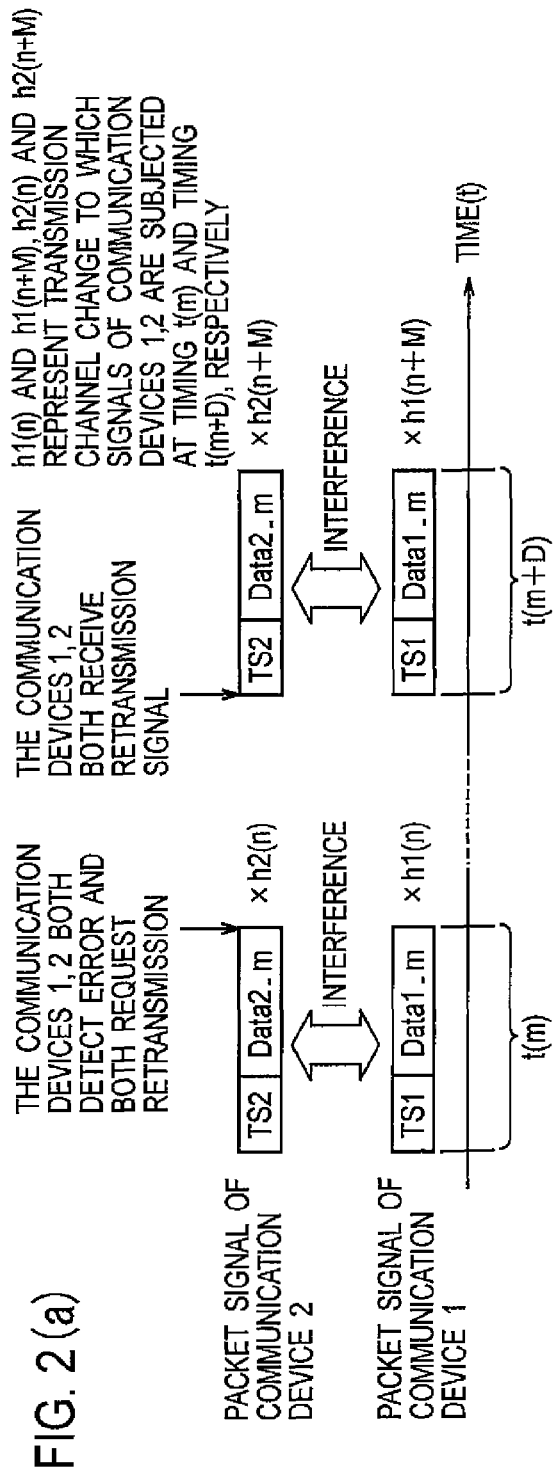
FIG. 2 is a view showing a reception image of packet signals of the communication device according to the conventional technique.
Figure 2:
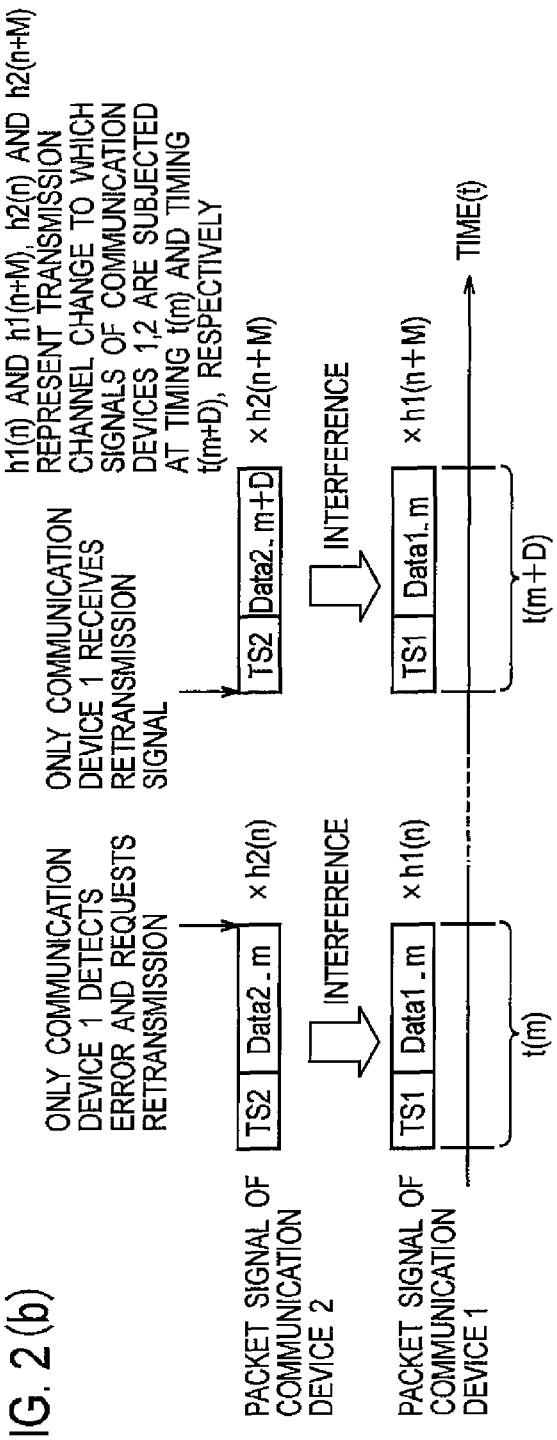

Embodiments of the present invention will be described hereinafter. Note that, throughout the drawings, the same or similar parts are denoted with the same or similar reference numerals. It should be noted, however, that the drawings are schematic and that proportions or the like of each of the dimensions differ from actual values.

First Embodiment of the Present Invention (Overall Schematic Configuration of Radio Communication System)

In a radio communication system according to a first embodiment, a radio base station performs radio communications with multiple terminal devices at the same timing (time slot) and over the same channel (frequency band) by Space Division Multiple Access (SDMA).

Figure 3:
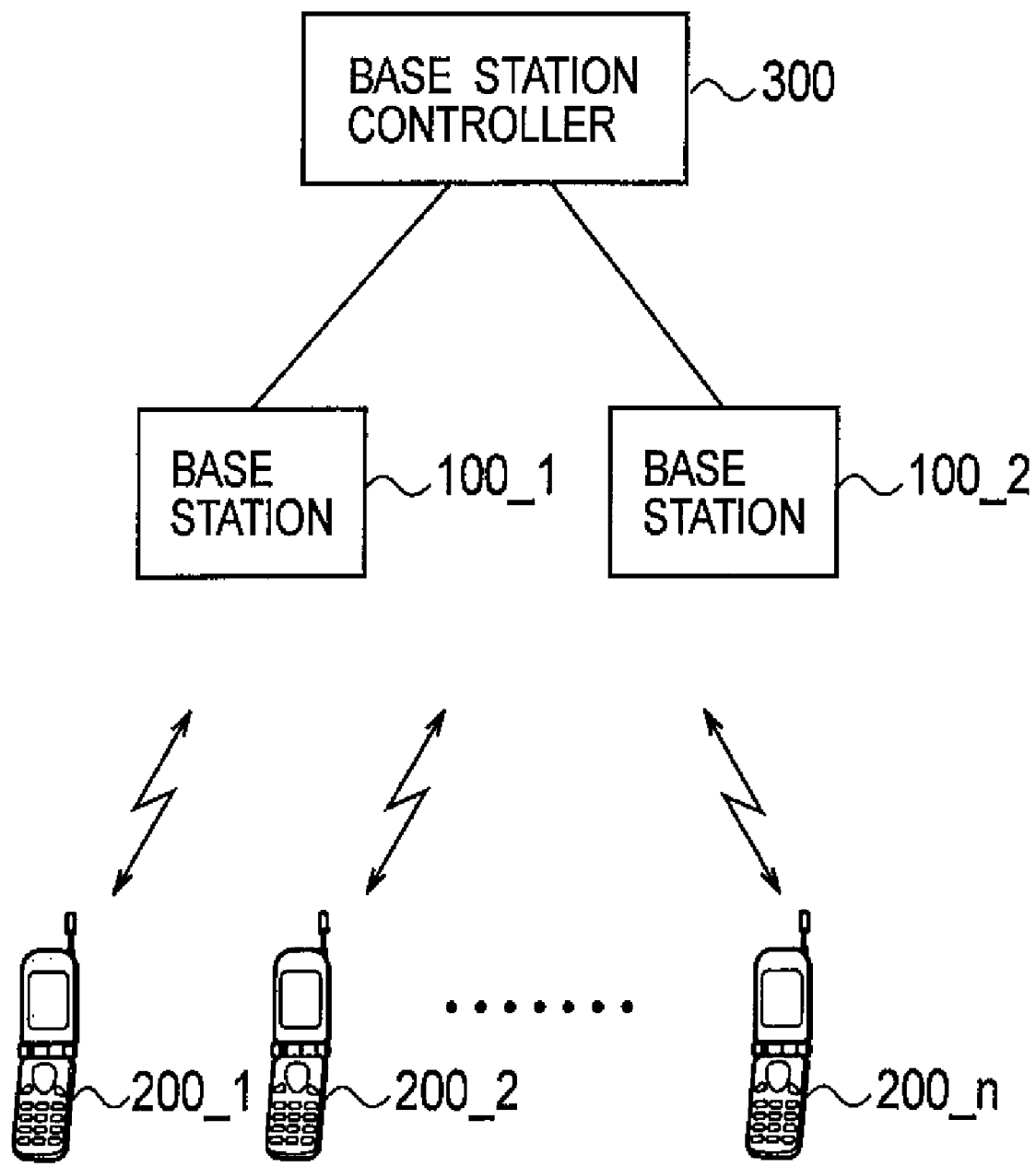
FIG. 3 is an overall schematic view showing a radio communication system according to a first embodiment of the present invention.

FIG. 3 is a view showing an overall schematic configuration of the radio communication system according to the embodiment. As shown in FIG. 3, the radio communication system according to the embodiment includes radio base stations 100_1 and 100_2, terminal devices 200_1 to 200_n, and a base station controller 300. The number of the base station controller 300 and that of the radio base stations 100_1 and 100_2 are not limited to the configuration of FIG. 3.

The radio base stations 100_1 and 100_2 communicate with the terminal devices 200_1 to 200_n through a radio link.

The terminal devices 200_1 to 200_n are terminals having a function of performing radio communications with the radio base stations 100_1 or 100_2. The terminal devices 200_1 to 200_n are a portable phone, a PHS, or a notebook computer, for example.

The base station controller 300 is connected to the radio base stations 100_1 and 100_2. In addition, the radio base stations 100_1 and 100_2 work under the base station controller 300, and their radio communications with the terminal devices 200_1 to 200_n are controlled by the base station controller 300.

(Overall Schematic Configuration of Terminal Devices)

Next, configurations of the terminal devices 200_1 to 200_n will be specifically described hereinafter with reference to FIG. 4. Note that since the terminal devices 200_1 to 200_n have a similar configuration, the configuration of the terminal device 200_1 will only be described. In addition, in the following, parts related to the present invention will be mainly described. Therefore, it should be noted the terminal device 200_1 may include a functional block (such as a power supply unit) that is essential to implement functions of the terminal device 200_1 but is not shown or the description of which is omitted.

The terminal device 200_1 is equipped with HARQ function. The terminal device 200_1 receives packet signals from the radio base stations 100_1 and 100_2 through a radio link. When detecting an error in a received packet signal, the terminal device 200_1 makes a request for retransmission, and combines the already received packet signal and a retransmission packet signal. In addition, the packet signal contains a known signal indicating information, such as training sequence (TS), known by its own device, and an unknown signal indicating information, such as communication data, not known by its own device.

Figure 4:
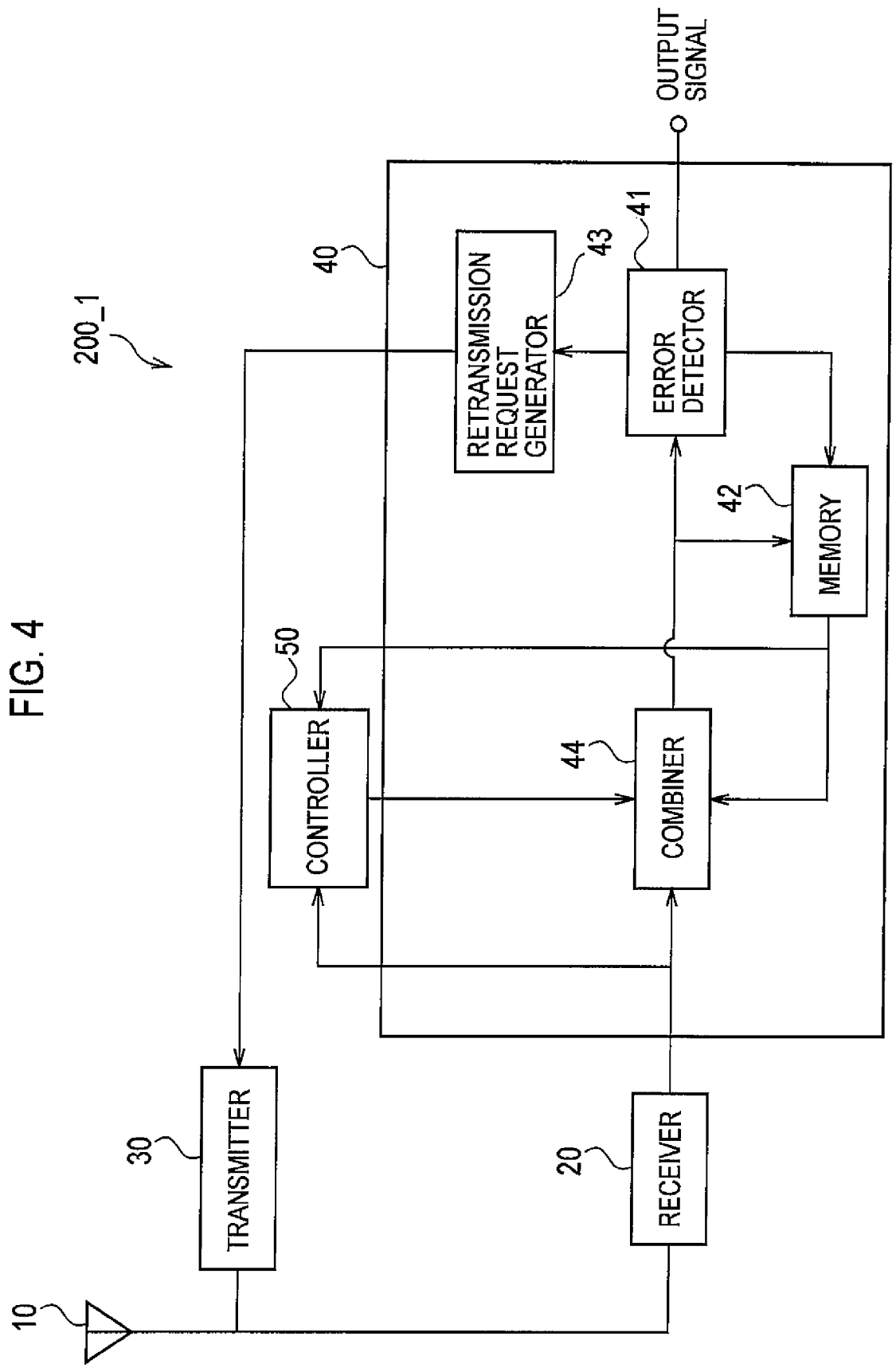
FIG. 4 is a functional block configuration diagram of a terminal device according to the first embodiment of the present invention.

In addition, as shown in FIG. 4, the terminal device 200_1 includes an antenna 10, a receiver 20, a transmitter 30, a signal processor 40, and a controller 50.

The antenna 10 is connected to the receiver 20 and the transmitter 30. The antenna 10 transmits and receives radio signals transmitted from the radio base stations 100_1 or 100_2.

The receiver 20 is connected to the antenna 10 and a combiner 44 of the signal processor 40, which is described later. In addition, the receiver 20 receives radio signals transmitted from the radio base station 100_1 or 100_2 through the antenna 10. The receiver 20 performs radio signal processing such as down conversion, A/D conversion processing, demodulation processing or the like, on the received radio signals, and transmits the processed signals to the combiner 44.

The transmitter 30 is connected to the antenna 10 and a retransmission request generator 43 of the signal processor 40, which is described later. The transmitter 30 performs modulation processing, D/A conversion process, or radio signal processing such as up-conversion on the inputted signal. The transmitter 30 transmits the processed signals to the radio base station 100_1 or 100_2 through the antenna 10.

The signal processor 40 performs processing for HARQ. Specifically, the signal processor 40 includes an error detector 41, a memory 42, the retransmission request generator 43, and the combiner 44.

The error detector 41 is connected to the memory 42, the retransmission request generator 43, the combiner 44, and an externally-provided external device (not shown). In addition, the error detector 41 performs decoding processing, such as error correction, on a packet signal outputted from the combiner 44, and then detects whether or not there is an error. Then, the error detector 41 transmits a packet signal in which no error is detected to the external device, and saves a packet signal in which an error is detected in the memory 42. Additionally, the error detector 41 transmits a control signal which is based on whether or not there is an error, to the memory 42 and the retransmission request generator 43.

The memory 42 is connected to the error detector 41, the combiner 44, and the controller 50 to be described later. In addition, when the error detector 41 detects an error, the memory 42 saves a combined packet signal.

The retransmission request generator 43 is connected to the error detector 41 and the transmitter 30. In response to the control signal from the error detector indicating that a packet signal needs to be retransmitted, the retransmission request generator 43 transmits a retransmission request signal to the radio base stations 100_1 and 100_2, which have sent the packet signals, through the transmitter 30 and the antenna 10.

The combiner 44 is connected to the receiver 20, the error detector 41, the memory 42, and the controller 50 to be described later. Based on a preset combining weight calculation scheme, the combiner 44 calculates a combining weight of a packet signal retransmitted from the radio base stations 100_1 and 100_2 (retransmission signal) and a saved signal saved in the memory 42. The combiner 44 performs processing for combining the retransmission signal and the saved signal on the basis of the calculated combining weight, and generates a combined signal.

Specifically, the combiner 44 refers to a known signal and an unknown signal which are included in each of the saved signal and the retransmission signal, and calculates a combining weight based on the both known signals and the both unknown signals, using a combining weight calculation scheme notified from the controller 50 to be described later. The combining weight calculated here is used to combine the saved signal saved in the memory 42 with the retransmission signal transmitted from the receiver 20. Then, the combiner 44 generates a combined signal by combining the saved signal and the retransmission signal on the basis of the calculated combining weight, and transmits the generated combined signal to the error detector 41.

In the embodiment, the combiner 44 combines the saved signal so and the retransmission signal through one of two combining schemes preset as the combining weight calculation scheme: a first combining scheme using an algorithm for decreasing interference waves and a second combining scheme using an algorithm for combining desired waves.

In the embodiment, Minimum Mean Squared Error (MMSE) scheme is assumed for the first combining scheme using the interference wave decrease algorithm. In the MMSE scheme, considering influence by an interference signal, or the like, a combining weight is calculated so that a mean squared error between a known signal that has been stored in advance and a known signal that was actually transmitted will be minimum value. As another scheme of the first combining scheme, a zero forcing (ZF) scheme may be used.

In the embodiment, a maximum ratio combining (MRC) scheme is assumed for the second combining scheme using the desired wave combining algorithm. In the MRC scheme, the combining is performed by calculating a combining weight corresponding to a phase or amplitude of a received signal so as to maximize a signal-to-noise power ratio (SNR) after combining. As another scheme of the second combining scheme, Equal Gain (ES) combining or the like may be used.

Additionally, the combiner 44 combines the saved signal and the retransmission signal by using the first combining scheme or the second combining scheme selected according to a combining scheme selection signal indicating either the first combining scheme or the second combining scheme. The combining scheme selection signal is transmitted from a combining scheme controller 504 of the controller 50 to be described later.

Figure 5:
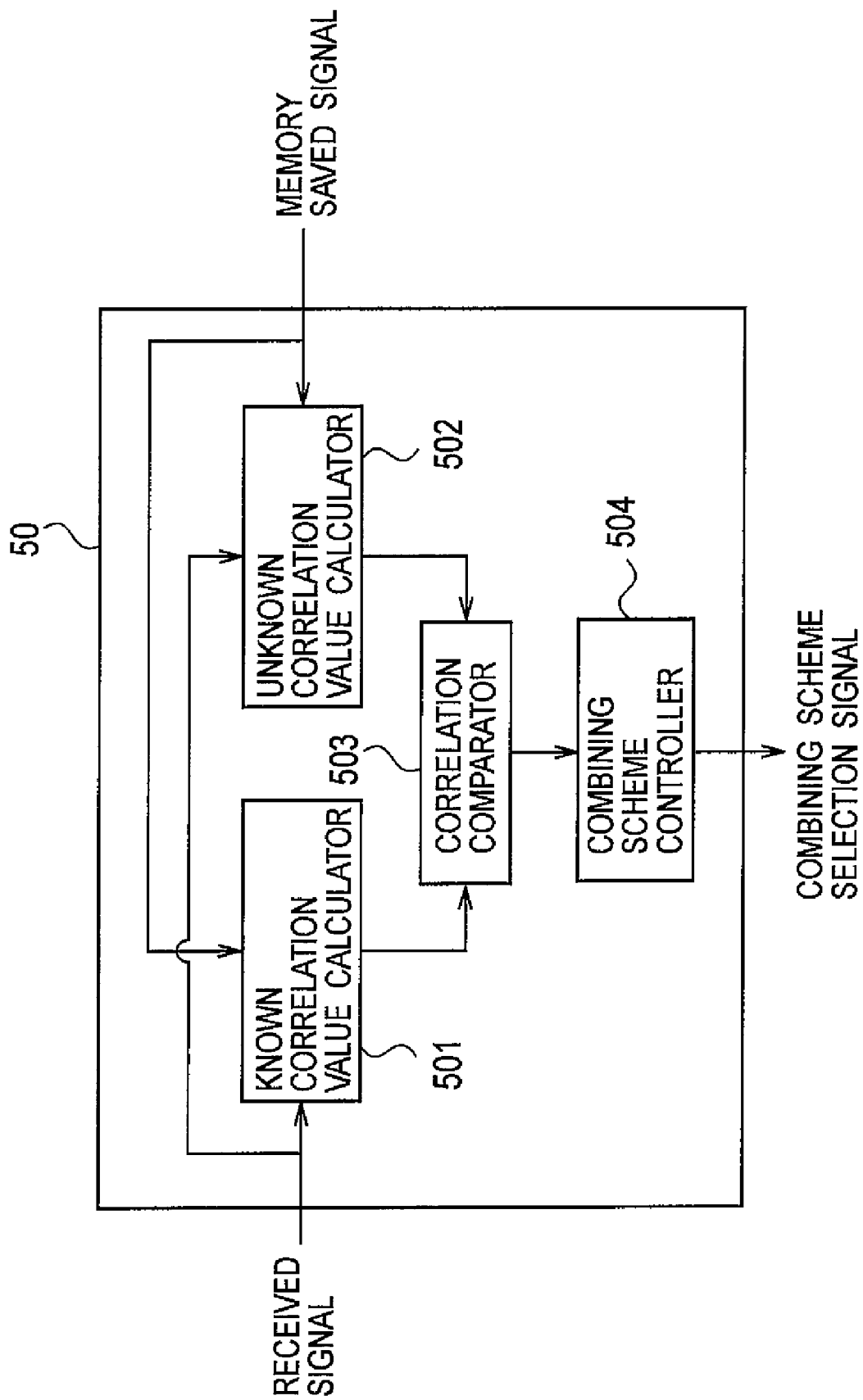
FIG. 5 is a functional block configuration diagram of a controller according to the first embodiment of the present invention.

The controller 50 controls a combining scheme to be used by the combiner 44. Specifically, as shown in FIG. 5, the controller 50 includes a known correlation value calculator 501, an unknown correlation value calculator 502, a correlation comparator 503, and a combining scheme controller 504.

The known correlation value calculator 501 is connected to the memory 42, the receiver 20, and the correlation comparator 503. The known correlation value calculator 501 calculates a known correlation value indicating a degree of correlation between known signals included in each of packet signals. Specifically, the known correlation value calculator 501 calculates a known correlation value indicating a degree of correlation between the known signal included in the saved signal saved in the memory 42 and a known signal included in the retransmission signal transmitted from the receiver 20. Then, the known correlation value calculator 501 notifies the correlation comparator 503 of the calculated known correlation value.

The unknown correlation value calculator 502 is connected to the memory 42, the receiver 20, and the correlation comparator 503. The unknown correlation calculator 502 calculates an unknown correlation value indicating a degree of correlation between unknown signals included in each of packet signals. Specifically, the unknown correlation value calculator 502 calculates an unknown correlation value indicating a degree of correlation between an unknown signal included in the saved signal saved in the memory 42 and an unknown signal included in the retransmission signal transmitted from the receiver 20. Then, the unknown correlation value calculator 502 notifies the correlation comparator 503 of the calculated unknown correlation value.

The correlation comparator 503 compares a correlation between known signals in each of packet signals and a correlation between unknown signals in the respective packet signals. Specifically, the correlation comparator 503 compares the known correlation value and the unknown correlation value calculated by the known correlation value calculator 501 and the unknown correlation value calculator 502, respectively.

Then, the correlation comparator 503 calculates a difference between the known correlation value and the unknown correlation value, and judges whether or not an absolute value of the difference between the known correlation value and the unknown correlation value is less than a preset threshold (predetermined value). In addition, the correlation comparator 503 notifies the combining scheme controller 504 of result of the comparison between the absolute value of the calculated difference and the threshold, as a result of comparison between the known correlation value and the unknown correlation value.

Based on the comparison result by the correlation comparator 503, the combining scheme controller 504 controls a scheme of combining packet signals. Specifically, based on the comparison result notified by the correlation comparator 503, the combining scheme controller 504 selects which scheme to use: the first combining scheme to perform combining while decreasing highly correlated noise signals in the saved signal and the retransmission signal, or the second combining scheme to performing combining while amplifying correlated parts in the saved signal and the retransmission signal.

Then, the combining scheme controller 504 selects the first combining scheme when the difference between the known correlation value and the unknown correlation value is less than the threshold, and selects the second combining scheme when the difference is equal to or more than the threshold. In addition, the combining scheme controller 504 transmits a combining scheme selection signal indicating the selected combining scheme to the combiner 44.

The combiner 44 combines the saved signal and the retransmission signal according to one of the first combining scheme and the second combining scheme which is selected by the combining scheme controller 504 and notified by the transmitted combining scheme selection signal.

Now, a theoretical background for selection of the first combining scheme or the second combining scheme will be described in detail. The scheme selection is performed by means of functions of the known correlation value calculator 501, the unknown correlation value calculator 502, the correlation comparator 503, and the combining scheme controller 504. For example, in received signals, a received signal $r(n)$, which is the $n^{th}$ symbol, is expressed as expression (1):

[Expression 1]

$$r(n)=s1(n)h1(n)+s2(n)h2(n)+n(n) \qquad (1)$$

In addition, focusing on the two terminal devices 200_1 and 200_2, for example, and, in particular, considering the terminal device 200_1 as a reference, $S1(n)$ is a desired wave signal (e.g., signal of the terminal device 200_1); $S2(n)$, an interference wave signal (e.g., radio signal for the terminal device 200_2); n(n), noise; $h1(n)$, transmission channel change to which the desired wave signal is subjected; and $h2(n)$, transmission channel change to which the interference wave signal is subjected.

Consider a case where an error is detected in an $m^{th}$ received packet including the $n^{th}$ symbol. In this case, not only the received packet is saved in the memory but also retransmission is requested, and a signal r(n+M) including a retransmission signal is received after an elapse of delay time M. When the terminal device 200_1 and 200_2 both request retransmission, a known correlation value $COR_k(m)$ is expressed as expression (2):

[Expression 2]

$$COR_k(m) = \frac{1}{nTS} \sum_{n=i}^{n=i+nTS-1} r(n)r^*(n+M) \qquad (2)$$

$$= \frac{1}{nTS} \sum_{n=i}^{n=i+nTS-1} \{s1(n)h1(n) + s2(n)h2(n) + n(n)\}$$

$$\{s1(n+M)h1(n+M) + s2(n+M)h2(n+M) + n(n+M)\}^*$$

$$= \frac{1}{nTS} \sum_{n=i}^{n=i+nTS-1} \{TS1(n-i)h1(n) + TS2(n-i)h2(n) + n(n)\}$$

$$\{TS1(n-i)h1(n+M) + TS2(n-i)h2(n+M) + n(n+M)\}^*$$

$$= \frac{1}{nTS} \sum_{n=i}^{n=i+nTS-1} \{TS1(n-i)h1(n) + TS2(n-i)h2(n) + n(n)\}$$

$$\{TS1(n-i)h1(n+M) + TS2(n-i)h2(n+M) + n(n+M)\}^*$$

$$\approx \frac{P_{TS1}}{nTS} \sum_{n=i}^{n=i+nTS-1} h1(n)h1^*(n+M) +$$

$$\frac{P_{TS2}}{nTS} \sum_{n=i}^{n=i+nTS-1} h2(n)h2^*(n+M)$$

In addition, an unknown correlation value $COR_u(m)$ is expressed as expression (3):

[Expression 3]

$$COR_u(m) = \frac{1}{nData} \sum_{n=j}^{n=j+nData-1} r(n)r^*(n+M) \quad (3)$$

$$= \frac{1}{nData} \sum_{n=j}^{n=j+nData-1} \{s1(n)h1(n) + s2(n)h2(n) + n(n)\}$$

$$\{s1(n+M)h1(n+M) + s2(n+M)h2(n+M) + n(n+M)\}^*$$

$$= \frac{1}{nData} \sum_{n=j}^{n=j+nData-1} \{Data1(n-j)h1(n) + Data2(n-j)h2(n) + n(n)\}$$

$$\{Data1(n-j)h1(n+M) + Data2(n-j)h2(n+M) + n(n+M)\}^*$$

$$\approx \frac{P_{Data1}}{nData} \sum_{n=j}^{n=j+nData-1} h1(n)h1^*(n+M) +$$

$$\frac{P_{Data2}}{nData} \sum_{n=j}^{n=j+nData-1} h2(n)h2^*(n+M)$$

Now if a general system of $P_{TSk}=P_{Datak}$ (k is a terminal device number) is assumed, a relation of the known correlation value $COR_k(m)$ and the unknown correlation value $COR_u(m)$ is as shown in expression 4:

[Expression 4]

$$COR_u(m) \approx COR_k(m) \quad (4)$$

On the other hand, if only the terminal device 200_1 requests retransmission, the known correlation value $COR_k(m)$ does not change from the case in which the both terminal devices requested retransmission. However, since the unknown correlation value $COR_u(m)$ is as shown in expression (5), the correlation of the known correlation value $COR_k(m)$/the unknown correlation value $COR_u(m)$ is as shown in expression (6).

[Expression 5]

$$COR_u(m) = \frac{1}{nData} \sum_{n=j}^{n=j+nData-1} r(n)r^*(n+M) \quad (5)$$

$$= \frac{1}{nData} \sum_{n=j}^{n=j+nData-1} \{s1(n)h1(n) + s2(n)h2(n) + n(n)\}$$

$$\{s1(n+M)h1(n+M) + s2(n+M)h2(n+M) + n(n+M)\}^*$$

$$= \frac{1}{nData} \sum_{n=j}^{n=j+nData-1} \{Data1(n-j)h1(n) + Data2(n-j)h2(n) + n(n)\}$$

$$\{Data1(n-j)h1(n+M) + Data2(n+M-j)h2(n+M) + n(n+M)\}^*$$

$$\approx \frac{P_{Data1}}{nData} \sum_{n=j}^{n=j+nData-1} h1(n)h1^*(n+M)$$

[Expression 6]

$$COR_u(m) \neq COR_k(m) \quad (6)$$

Thus, when a comparison with a threshold is performed as shown in expression (7) and the difference is less than the threshold, the first combining scheme using the interference wave decrease algorithm is selected.

[Expression 7]

$$|COR_u(m)-COR_k(m)| < \text{threshold} \quad (7)$$

In addition, if the difference is equal to or more than the threshold, the second combining scheme using the desired wave combining algorithm is selected.

[Expression 8]

$$|COR_u(m)-COR_k(m)| \geq \text{threshold} \quad (8)$$

In this way, the controller 50 selects the first combining scheme or the second combining scheme, and the combiner 44 performs the processing for combining the saved signal and the retransmission signal.

(Operation of Terminal Devices)

The operation of the terminal device 200_1 having the configuration described above will be described hereinafter with reference to FIG. 6.

Figure 6:
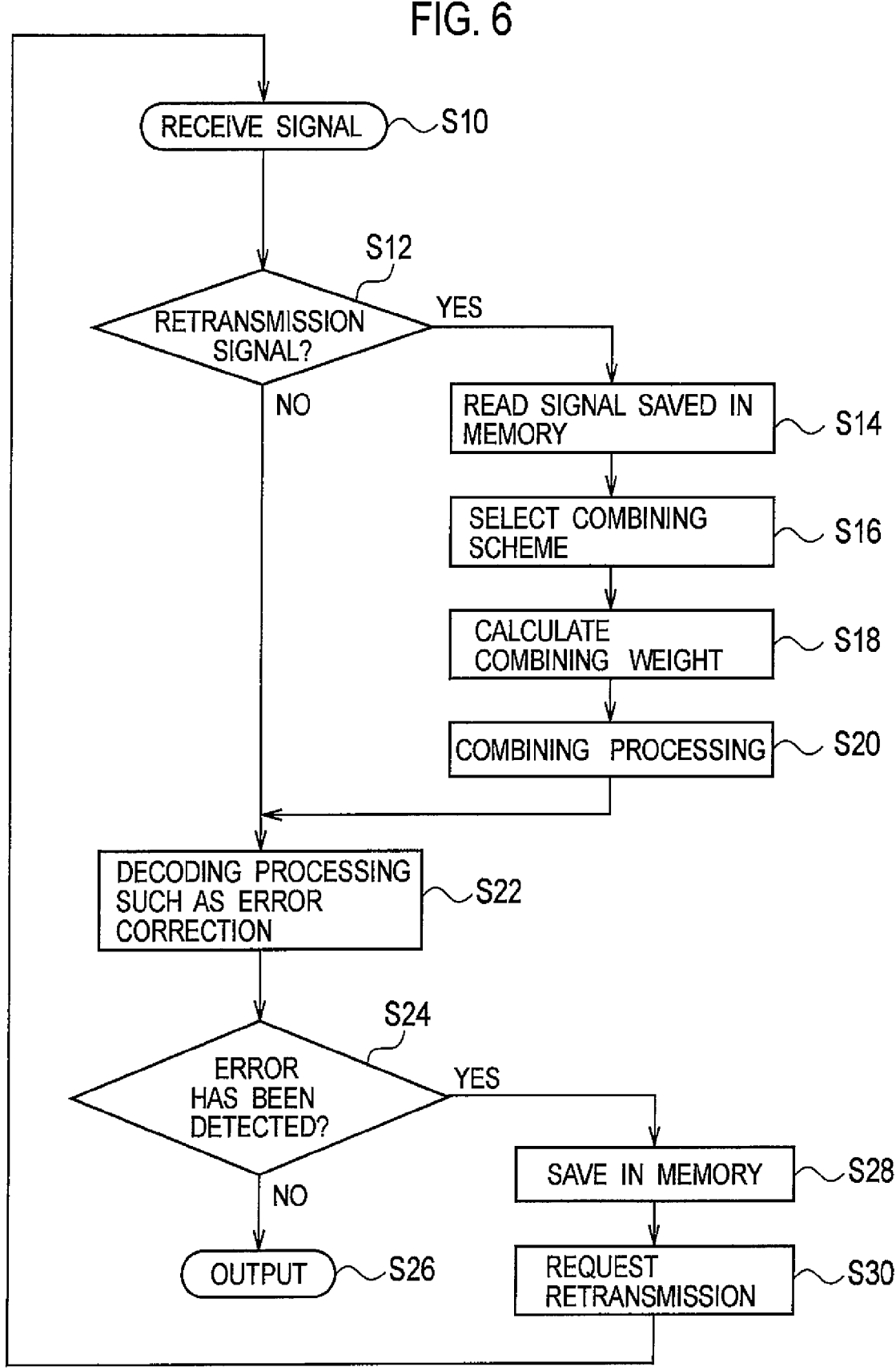
FIG. 6 is a flow chart showing the operation of the terminal device according to the first embodiment of the present invention.

FIG. 6 is a flow chart showing the operation performed by the terminal device 200_1 upon receipt of a packet signal.

In step S10, the receiver 20 of the terminal device 200_1 receives a packet signal. Then, the receiver 20 transmits the received packet signal to the combiner 44 and to the controller 50.

In step S12, the combiner 44 and the controller 50 judge whether or not the packet signal transmitted from the receiver 20 is a retransmission signal.

In step S14 (in the case of "Y" in step S12), in the terminal device 200_1, the controller 50 reads a saved signal saved in the memory 42.

In step S16, the controller 50 calculates a known correlation value $COR_k(m)$ and an unknown correlation value $COR_u(m)$ on the basis of the retransmission signal and the saved signal. The controller 50 selects any of the first combining scheme and the second combining scheme on the basis of a difference between the known correlation value $COR_k(m)$ and the unknown correlation value $COR_u(m)$. Then, the controller 50 transmits a combining scheme selection signal indicating the selected combining scheme to the combiner 44.

In step S18, the combiner 44 reads the saved signal saved in the memory 42. The combiner 44 then calculates a combining weight of the saved signal and the retransmission signal by using the first combining scheme or the second combining scheme indicated by the combining scheme selection signal transmitted from the controller 50.

In step S20, the combiner 44 generates a combined signal by combining the saved signal and the retransmission signal on the basis of the calculated combining weight. Then, the combiner transmits the generated combined signal to the error detector 41.

In step S22 (in the case of "N" in step S12), the error detector 41 receives the combined signal and the packet signal transmitted from the combiner 44, and performs decoding processing such as error correction.

In step S24, the error detector 41 judges whether or not an error is detected in the signal subjected to the decoding processing.

In step S26, that is when no error is detected ("N" in step S24), the error detector 41 outputs the processed signal to the external device.

In step S28, that is when an error is detected ("Y" in step S24), the error detector 41 saves the processed signal in the memory 42 as a saved signal.

In step S30, the error detector 41 notifies the retransmission request generator 43 of detection of an error. Then, the retransmission request generator 43 transmits a transmission request signal to the radio base stations 100_1 and 100_2 through the transmitter 30.

In this way, from the radio base stations 100_1 or 100_2, the terminal device 200_1 according to the embodiment receives a packet signal (saved signal) transmitted through a radio link and a packet signal (retransmission signal) that is the same signal as the above packet signal and has been retransmitted subsequently. The terminal device 200_1 performs the HARQ processing to perform combining while decreasing noise signals included in the saved signal and the retransmission signal, respectively.

Figure 7:
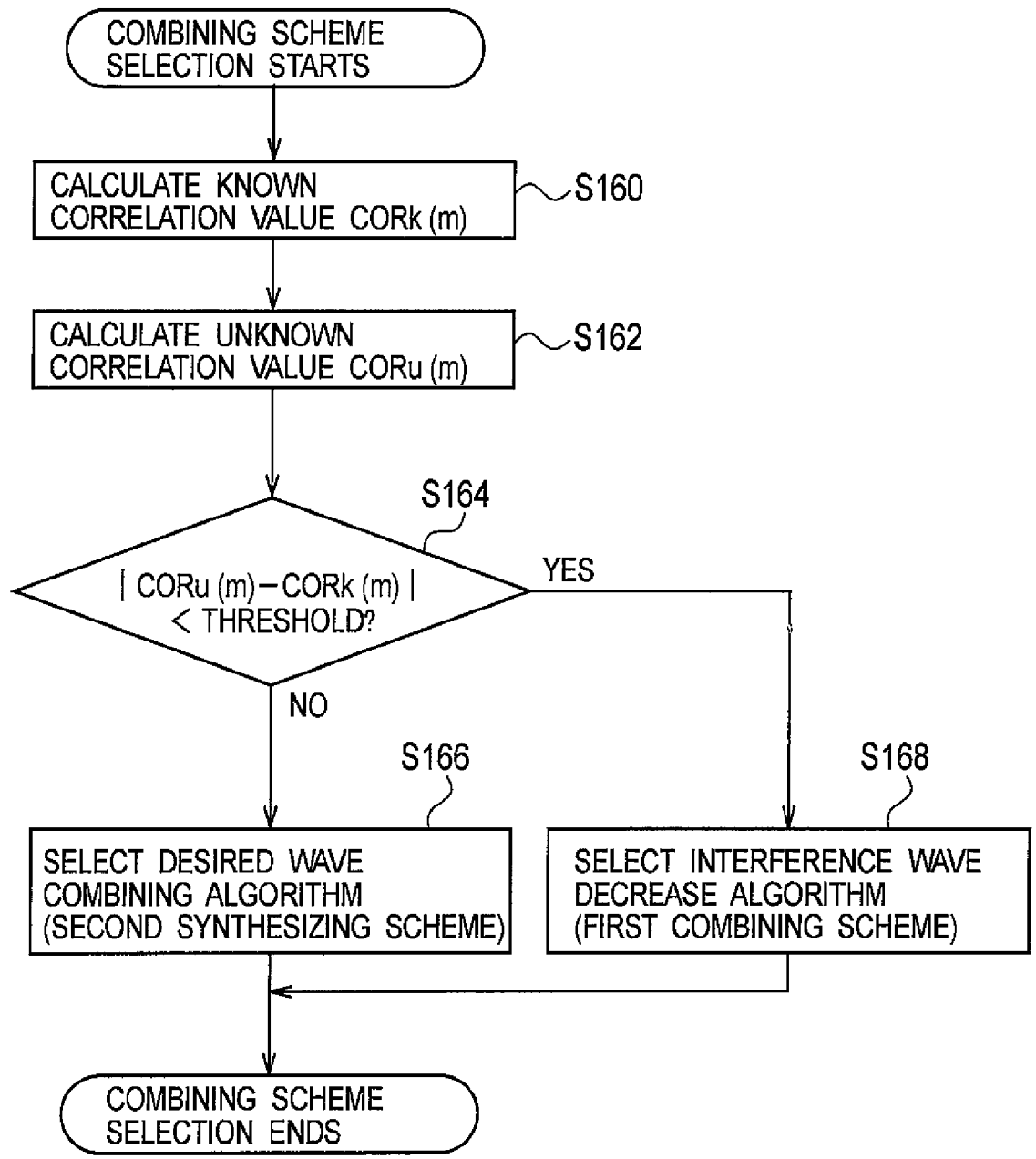
FIG. 7 is a flow chart showing the operation of the terminal device according to the first embodiment of the present invention.

Next, the operation of the controller 50 performed in above-described step S16 will be specifically described with reference to the flow chart of FIG. 7.

In step S160, the known correlation value calculator 501 of the controller 50 calculates a known correlation value $COR_k(m)$ on the basis of a known signal included in a retransmission signal transmitted from the receiver 20 and of a known signal included in a saved signal read from the memory 42.

In step S162, the unknown correlation value calculator 502 calculates an unknown correlation value $COR_u(m)$ on the basis of an unknown signal included in the retransmission signal transmitted from the receiver 20 and an unknown signal included in the saved signal read from the memory 42.

In step S164, the correlation comparator 503 judges whether or not an absolute value of a calculated difference between the known correlation value $COR_k(m)$ and the unknown correlation value $COR_u(m)$ is less than a threshold.

Then, the correlation comparator 503 notifies the combining scheme controller 504 of the judgment result.

In step S166, that is when notified that the absolute value of the difference is equal to or more than the threshold ("N" in step S164), the combining scheme controller 504 selects the second combining scheme using the desired wave combining algorithm, based on the notification from the correlation comparator 503. The combining scheme controller 504 then transmits a combining scheme selection signal indicating the selected second combining scheme to the combiner 44.

In step S168, that is when notified that the absolute value of the difference is less than the threshold ("Y" in step S164), the combining scheme controller 504 selects the first combining scheme using the interference wave decrease algorithm, based on the notification from the correlation comparator 503. The combining scheme controller 504 then transmits a combining scheme selection signal indicating the selected first combining scheme to the combiner 44.

Advantageous Effects According to First Embodiment

The terminal device 200_1 according to the embodiment calculates an absolute value of a difference between a known correlation value $COR_k(m)$ indicating a degree of correlation between known signals included in a saved signal and a retransmission signal, respectively, and an unknown correlation value $COR_u(m)$ indicating a degree of correlation between unknown signals included in the saved signal and the retransmission signal, respectively. Then, the terminal device 200_1 selects the first combining scheme using the interference wave decrease algorithm to combine the saved signal and the retransmission signal when the calculated absolute value of the difference is less than a threshold, that is, when changes in noise signals included in the known signals in the saved signal and the retransmission signal, respectively, are analogous to changes in noise signals included in the unknown signals (when the noise signals are highly correlated).

Thus, if a saved signal and a retransmission signal received includes highly correlated interference signals generated from the packet signal transmitted and retransmitted to other devices (e.g., the terminal device 200_2), the terminal device calculates a combining weight by using the first combining scheme employing the interference wave decrease algorithm such as MMSE. Since the saved signal and the retransmission signal are combined based on the combining weight, the terminal device 200_1 can perform the combining while decreasing highly correlated interference signals included in the saved signal and the retransmission signal, respectively.

In addition, if the known correlation value $COR_k(m)$ and the unknown correlation value $COR_u(m)$ of the saved signal and the retransmission signal are equal to or more than the threshold, that is, when changes in (a degree of correlation between) the noise signals included in each of known signals of the saved signal and the retransmission signal is widely different from changes in (a degree of correlation between) the noise signals included in the respective unknown signals, the terminal device 200_1 selects the second combining scheme employing a desired wave combining algorithm such as MRC to perform combining while considering that different noise signals are included in the unknown signal of the saved signal and the retransmission signals.

In the conventional technique, combining is performed based only on noise signals included in the respective known signals in the saved signal and the retransmission signal. Unlike the conventional technique, the terminal device 200_1 combines the saved signal and the retransmission signal while considering also the noise signals included in the respective unknown signals. Thus, the error rate of the combined packet signal can be improved. Therefore, the terminal device 200_1 can further improve the error rate of the combined packet signal in the radio communication system with the HARQ function.

When the absolute value of the difference between the known correlation value $COR_k(m)$ and the unknown correlation value $COR_u(m)$ is less than the threshold, the terminal device 200_1 considers that highly correlated noise signals are included in the respective known signals and the respective unknown signals of the both packet signals. Then, the terminal device 200_1 selects the first scheme that decreases the highly correlated noise signals, and combines the saved signal and the retransmission signal. Accordingly, the error rate of the combined packet signals can be further improved.

On the other hand, when the absolute value of the difference between the known correlation value $COR_k(m)$ and the unknown correlation value $COR_u(m)$ is equal to or more than the threshold, the terminal device 200_1 considers that different noise signals are included in the respective known signals and the respective unknown signals of the both packet signals. Then, the terminal device 200_1 selects the second scheme to performing combining while amplifying highly correlated parts, and combines the saved signal and the retransmission signal. Accordingly, the error rate of the combined packet signals can be further improved.

In addition, when the absolute value of the difference between the known correlation value $COR_k(m)$ and the unknown correlation value $COR_u(m)$ is less than the threshold, the terminal device 200_1 combines the saved signal and the retransmission signal by using MMSE as the first combining scheme to perform combining while decreasing highly correlated noise signals. Thereby, the error rate of the combined packet signals can be improved. In addition, if the absolute value of the difference between the known correlation value $COR_k(m)$ and the unknown correlation value $COR_u(m)$ is equal to or more than the threshold, the terminal device combines the saved signal and the retransmission signal by using MRC as the second combining scheme to perform combining while amplifying highly correlated parts. Thereby, the error rate of the combined packet signals can be improved.

Second Embodiment

A second embodiment of the present invention will be described hereinafter, focusing on differences from the first embodiment.

In the radio communication system of the first embodiment, a description has been given of the case where the terminal device 200_1 is equipped with the HARQ function. On the other hand, in the radio communication system according to the embodiment, a description will be given of a case where radio base stations 100_1 and 100_2 are equipped with HARQ function.

Also in the embodiment, like the first embodiment, in the radio communication system, the radio base stations are equipped is with functions such as Space Division Multiple Access (SDMA), and perform radio communications with multiple terminal devices at the same timing (time slot) and over the same channel (frequency band).

As an example, a description will be given of a case where the radio base stations 100_1 and 100_2 according to the embodiment perform radio communications with multiple terminal devices 200_1 to 200_n through one channel by spatial multiplexing. It is needless to say that the radio base stations 100_1 and 100_2 can also perform radio communications with the terminal devices 200_1 to 200_n through multiple channels.

Configurations of the radio base stations 100_1 and 100_2 according to the embodiment will be described. Since the radio base stations 100_1 and 100_2 have a similar configuration, the configuration of the radio base station 100_1 will be described.

Figure 8:
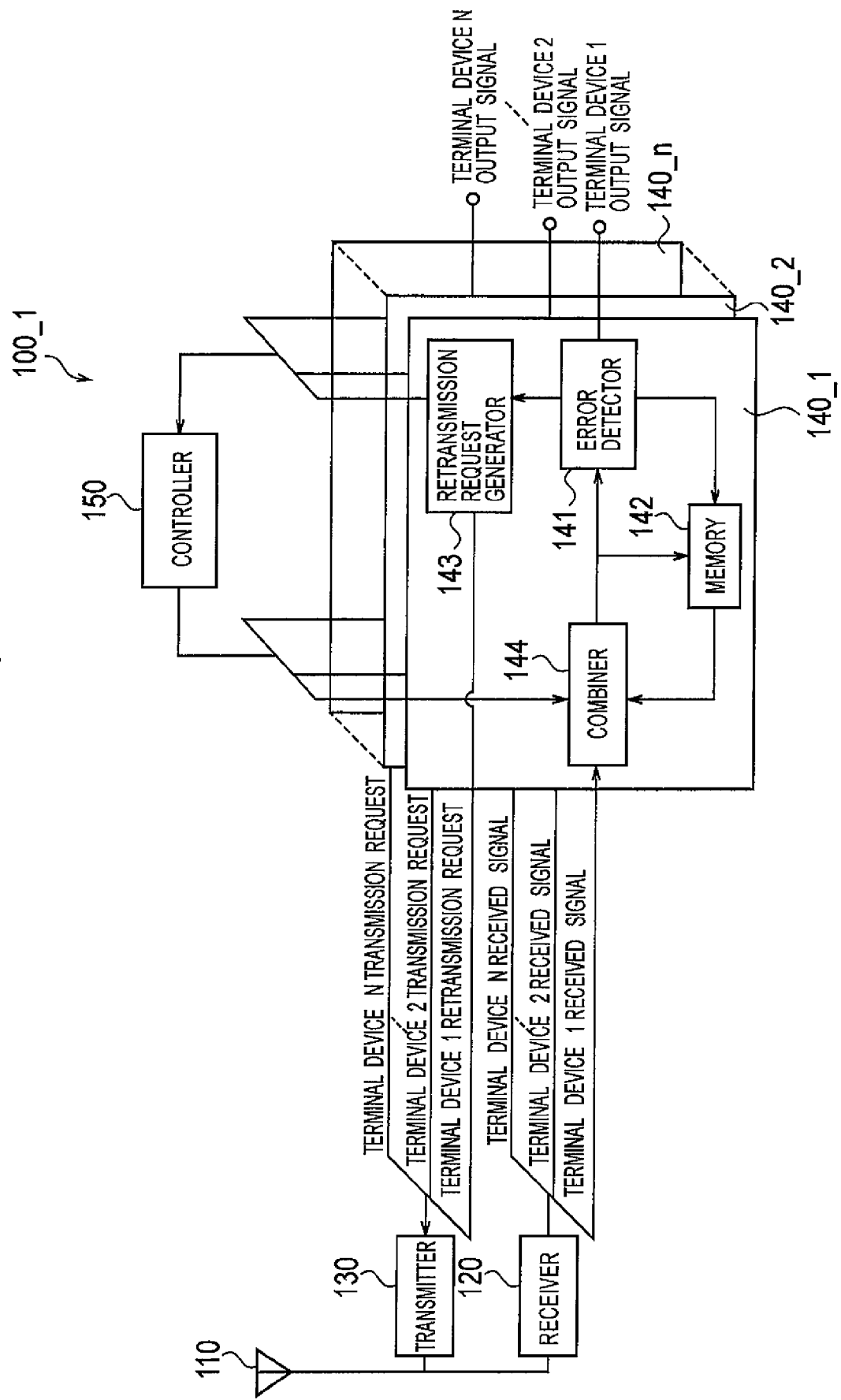
FIG. 8 is a functional block configuration diagram of a radio base station according to the second embodiment of the present invention.

As shown in FIG. 8, the radio base station 100_1 includes an antenna 110, a receiver 120, a transmitter 130, signal processors 140_1 to 140_n, and a controller 150.

The antenna 110 is connected to the receiver 120 and the transmitter 130. The antenna 110 transmits and receives radio signals to and from the terminal devices 200_1 to 200_n.

The receiver 120 is connected to the antenna 110, and combiners included in the respective signal processors 140_1 to 140_n, to be described later. The receiver 120 receives radio signals from the multiple terminals 200_1 to 200_n through the antenna 110, and transmits the received signals to the combiner 144 of each of the signal processors.

The transmitter 130 is connected to the antenna 110, and retransmission request generators in included in the respective signal processors 140_1 to 140_n. The transmitter 130 transmits radio signals to the multiple terminal devices 200_1 to 200_n through the antenna 110.

The signal processors 140_1 to 140_n correspond with the respective terminal devices 200_1 to 200_n assigned to one channel by spatial multiplexing, and perform HARQ processing for radio communications with the terminal devices 200_1 to 200_n. In the embodiment, the number "n" of the signal processors 140_1 to 140_n represents the number of spatial multiplexing terminals that actually transmitted signals in that slot.

Configurations of the signal processors 140_1 to 140_n will be specifically described hereinafter. Since the signal processors 140_1 to 140_n have a similar configuration, the configuration of the signal processor 140_1 will be described.

The signal processor 140_1 includes an error detector 141, a memory 142, a retransmission request generator 143, and a combiner 144. Since the error detector 141, the memory 142, and the combiner 144 have similar configurations to the error detector 41, the memory 42, and the combiner 44, respectively, according to the first embodiment, descriptions for these parts will be omitted.

The retransmission request generator 143 is connected to the transmitter 130, the error detector 141, and the controller 150. In response to a control signal from the error detector 141 requesting retransmission of a packet signal, the retransmission request generator 143 transmits a retransmission request signal to one of the terminal devices 200_1 to 200_n, which has sent the packet signal, through the transmitter 130 and the antenna 110. In addition, the retransmission request generator 143 according to the embodiment transmits the retransmission request signal to the transmitter 130 and the controller 150.

The controller 150 is connected to the transmission request generators 143 and the combiners 144 of the respective signal processors 140_1 to 140_n. In addition, the controller 150 selects a first combining scheme or a second combining scheme on the basis of the number of retransmission signals transmitted from the retransmission request generators 143 of the signal processors 140_1 to 140_n.

Figure 9:
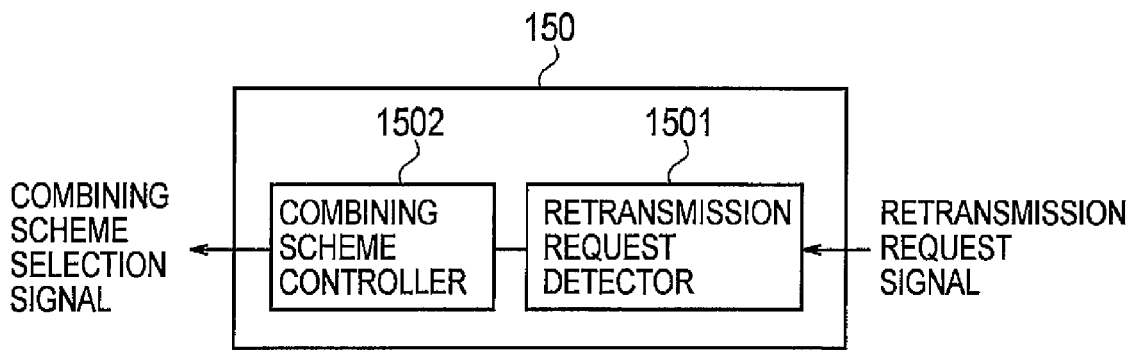
FIG. 9 is a functional block configuration diagram of a controller according to the second embodiment of the present invention.

Specifically, as shown in FIG. 9, the controller 150 includes a retransmission request detector 1501 and a combining scheme controller 1502.

The retransmission request detector 1501 counts the number of retransmission request signals transmitted from the retransmission request generator 143 of the signal processors 140_1 to 140_$n$ at predetermined timing (e.g., every time slot). The retransmission request detector 1501 judges whether or not a retransmission request signal is received from the retransmission request generator 143 of all of the signal processors 140_1 to 140_$n$ within the predetermined timing. In other words, the retransmission request detector 1501 judges whether or not retransmission request signals of the maximum number "n" of spatial multiplexing are received within the predetermined timing. Then, the retransmission request detector 1501 notifies the combining scheme controller 1502 of the judgment result.

In response to the notification, from the retransmission request detector 1501, of the receipt of the retransmission request signals of the maximum number "n" of spatial multiplexing, the combining scheme controller 1502 selects a first combining scheme employing an interference wave decrease algorithm. In addition, when the retransmission request signals of the maximum number "n" of spatial multiplexing have not been received, the combining scheme controller 1502 selects a second combining scheme employing a desired wave combining algorithm.

The combining scheme controller 1502 transmits a combining scheme selection signal indicating the first combining scheme or the second combining scheme to the combiner of the signal processor 140_1 including the retransmission request generator that transmitted the retransmission request signal to the retransmission request detector 1501.

(Operation of Radio Base Station)

The operation of the radio base station 100_1 having the configuration described above will be described hereinafter with reference to FIG. 10.

Figure 10:
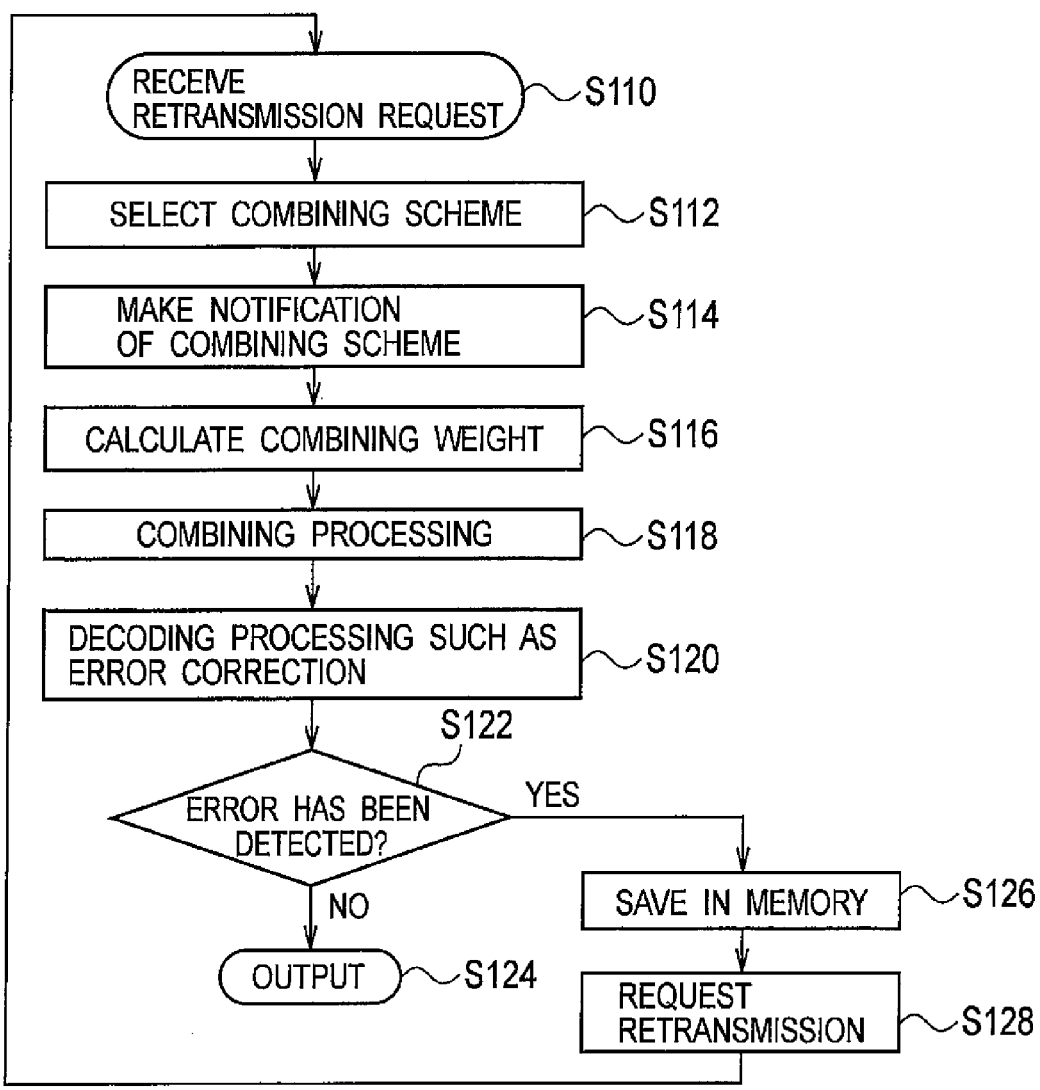
FIG. 10 is a flow chart showing the operation of a radio base station according to the second embodiment of the present invention.

FIG. 10 is a flow chart of the operation performed by the radio base station 100_1 when selecting the first combining scheme or the second combining scheme, and combining a saved signal and a retransmission signal.

In step S110, in the radio base station 100_1, the retransmission request generators 143 of the respective signal processors 140_1 to 140_$n$ transmit are transmission request signal by way of the transmitter 130 and the antenna 110. Here, the retransmission request generators 143 transmit the retransmission request signal to the retransmission request detector 1501 of the controller 150.

In step S112, the retransmission request detector 1501 receives the retransmission request signal from the retransmission request generators of the respective signal processors 140_1 to 140_$n$. In addition, the retransmission request detector 1501 judges whether or not retransmission request signals of the maximum number "n" of spatial multiplexing have been received, and notifies the combining scheme controller 1502 of the judgment result. The combining scheme controller 1502 selects the first combining scheme or the second combining scheme depending on the notified judgment result.

In step S114, the combining scheme controller 1502 transmits a combining scheme selection signal indicating the selected combining scheme to the combiner 144 of a corresponding one of the signal processors 140_1 to 140_$n$ including the retransmission request generator that transmitted the retransmission request signal.

Since the subsequent operations performed from the step S116 to step S128 are similar to the operations performed from step S18 to step S30 (see FIG. 6) according to the first embodiment, a description will be omitted.

Figure 11:
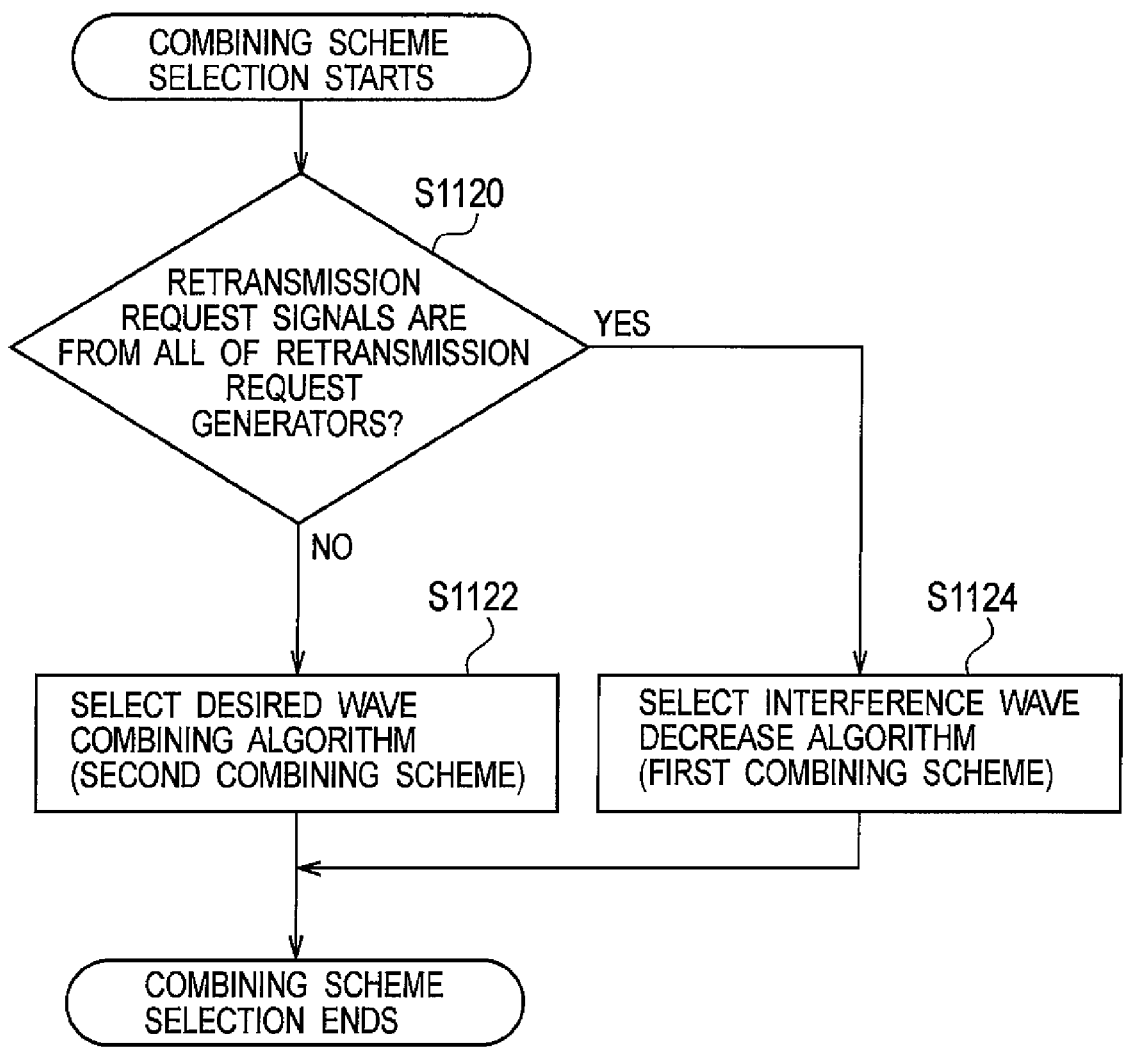
FIG. 11 is a flow chart showing the operation of the radio base station according to the second embodiment of the present invention.

The operation of the controller 150 in step S112 described above will be specifically described hereinafter with reference to the flowchart of FIG. 11.

In step S1120, the retransmission request detector 1501 of the controller 150 receives a retransmission request signal from the retransmission request generators 143 of the respective signal processors 140_1 to 140_$n$. In addition, the retransmission request detector 1501 judges whether or not the retransmission request signals of the maximum number "n" of spatial multiplexing have been received, and notifies the combining scheme controller 1502 of the judgment result.

In step S1122, when notified from the retransmission request detector 1510 of the judgment result indicating that the retransmission request signals of the maximum number "n" of spatial multiplexing have not been received, the combining scheme controller 1502 selects the second combining scheme.

In step S1124, when notified from the retransmission request detector 1501 of the judgment result indicating that the retransmission request signals of the maximum number "n" of spatial multiplexing have been received, the combining scheme controller 1502 selects the first combining scheme.

Advantageous Effects According to Second Embodiment

The first combining scheme is selected if the radio base station 100_1 according to the embodiment has received the retransmission request signals of the maximum number "n" of spatial multiplexing with the multiple terminal devices 200_1 to 200_$n$ at the same timing and over the same channel, in other words, when the retransmission request signal is transmitted to all of the terminal devices 200_1 to 200_$n$ capable of spatial multiplexing.

Thus, the first combining scheme employing the algorithm for interference wave decrease is selected if the most interference signals from the multiple terminal devices 200_1 to 200_$n$ are generated by the terminal devices 200_1 to 200_$n$ capable of spatial multiplexing transmitting retransmission signals. In the radio base station 100_1, not only a combining weight of saved signals and retransmission signals is calculated, but also the saved signals are combined with the retransmission signals. Accordingly, an error rate of combined signals can be further improved.

Other Embodiments

As described above, the present invention has been disclosed through one embodiment of the present invention. However, it should not be understood that descriptions and drawings that form a part of the disclosure limit the present invention. Various alternative embodiments will be apparent to those skilled in the art from this disclosure.

For example, in the first embodiment described above, the correlation comparator 503 judges whether or not an absolute value of a difference between a calculated known correlation value $COR_k(m)$ and an unknown correlation value $COR_u(m)$ is less than a threshold. Alternatively, the correlation comparator 503 may judge whether or not a ratio of the known correlation value $COR_k(m)$ and the unknown correlation value $COR_u(m)$ is less than a threshold of a predetermined ratio.

In addition, in the first embodiment described above, the case where the terminal device 200_1 (communication device) includes the signal processor 40 and the controller 50 has been described. Alternatively, such functions may be included in the radio base stations 100_1 and 100_2.

In addition, the retransmission request detector 1501 according to the second embodiment is configured to judge whether or not retransmission request signals of the maximum number "n" of spatial multiplexing in one channel have been received within the predetermined timing. Alternatively, the retransmission request detector 1501 may be configured to judge whether or not retransmission request signals greater than a preset threshold (e.g., a predetermined number such as "3") have been received and to notify the combining scheme controller 1502 of the judgment result. Then, the combining scheme controller 1502 may be configured to select the first combining scheme or the second combining scheme, on the basis of the notification.

In addition, the controller 150 is included in the radio base stations 100_1 and 100_2 according to the second embodiment described above. Alternatively, the controller 150 may be included in the base station controller 300 that controls the multiple radio base stations 100_1 and 100_2. Such configuration makes it possible for the base controller 300 to notify the combiner 44 of each of the radio base stations 100_1 and 100_2 to use the first combining scheme employing the interference wave decrease algorithm, when the radio base stations 100_1 and 100_2 the radio ranges of which are adjacent to each other and which are thus likely to interfere with each other make retransmission requests using the same channel within a predetermined timing.

As described above, the present invention of course includes various embodiments that have not been described herein. Therefore, a technical scope of the present invention is defined only by matters specified by the invention according to the scope of claims appropriate from the above-described description.

Additionally, the entire content of Japanese Patent Application No. 2006-234493 (filed on Aug. 30, 2006) is incorporated herein by reference.

INDUSTRIAL APPLICABILITY

As described above, in a radio communication system with the HARQ function, a communication device and a control method according to the present invention can further improve an error rate of combined packet signals, and accordingly are useful in radio communications such as mobile communication.

The invention claimed is:

1. A communication device including:
a receiver configured to receive, through a radio link, a plurality of packet signals each including a known signal indicating information known by the communication device and an unknown signal indicating information not known by the communication device;
a signal processor configured to combine the packet signals while decreasing noise signals included in the packet signals; and
a controller configured to compare a correlation between known signals in the packet signals with a correlation between unknown signals in the packet signals, and to control a scheme of combining the packet signals, on the basis of a result of the comparison.

2. The communication device according to claim 1, further comprising:
a known correlation value calculator configured to calculate a known correlation value indicating a degree of correlation between the known signals included in each of the packet signals; and
an unknown correlation value calculator configured to calculate an unknown correlation value indicating a degree of correlation between the unknown signals included in each of the packet signals, wherein
the controller compares the calculated known correlation value with the calculated unknown correlation value.

3. The communication device according to any one of claims 1 and 2, wherein
the controller selects whether to use a first combining scheme or to use a second combining scheme, on the basis of the result of the comparison,
the first combining scheme is a scheme of combining the packet signals after decreasing highly correlated noise signals in the packet signals, and
the second combining scheme is a scheme of combining the packet signals after amplifying correlated parts in the packet signals.

4. The communication device according to claim 3, wherein the controller
compares a difference between the known correlation value and the unknown correlation value with a predetermined value, and
selects the first combining scheme when the difference is less than the predetermined value.

5. A control method employed for a communication device including: a receiver configured to receive, through a radio link, a plurality of packet signals each including a known signal indicating information known by the communication device and an unknown signal indicating information not known by the communication device; and a combiner configured to combine the packet signals while decreasing noise signals included in the packet signals, the control method comprising:
a correlation comparison step of comparing a correlation between known signals in the packet signals with a correlation between unknown signals in the packet signals; and
a combining scheme control step of controlling a scheme of combining the packet signals, on the basis of a result of the correlation comparison step.

6. The control method according to claim 5, further comprising:
a known correlation value calculation step of calculating a known correlation value indicating a degree of correlation between the known signals included in each of the packet signals; and
an unknown correlation value calculation step of calculating an unknown correlation value indicating a degree of correlation between the unknown signals included in each of the packet signals, wherein
in the correlation comparison step, the calculated known correlation value is compared with the calculated unknown correlation value.

7. The control method according to any one of claims 5 and 6 wherein
in the combining scheme control step, whether to use the first combining scheme or to use the second combining scheme is selected on the basis of the result obtained in the correlation comparison step,
the first combining scheme is a scheme of combining the packet signals after decreasing highly correlated noise signals in the packet signals, and
the second combining scheme is a scheme of combining the packet signals after amplifying correlated parts in the packet signals.

8. The control method according to claim 7 wherein
in the correlation comparison step, a difference between the known correlation value and the unknown correlation value is compared with a predetermined value, and
in the combining scheme control step, the first combining scheme is selected when the difference is less than the predetermined value.

* * * * *